United States Patent [19]

Euteneuer

[11] Patent Number: 4,941,763
[45] Date of Patent: Jul. 17, 1990

[54] GROOVED SUPPORT COLUMN HAVING ADAPTABLE CONNECTORS

[75] Inventor: Vaughan O. Euteneuer, Dallas, Tex.

[73] Assignee: MPS Industries, Inc., Arlington, Tex.

[21] Appl. No.: 277,404

[22] Filed: Nov. 28, 1988

Related U.S. Application Data

[63] Continuation of Ser. No. 113,390, Oct. 22, 1987, abandoned, which is a continuation-in-part of Ser. No. 871,241, Jun. 6, 1986, abandoned.

[51] Int. Cl.⁵ ............................................... F16D 1/00
[52] U.S. Cl. ........................................ 403/3; 403/381; 52/738
[58] Field of Search ................ 403/331, 236, 362, 381, 403/344, 3, 4; 52/738

[56] References Cited

U.S. PATENT DOCUMENTS

| 3,462,110 | 8/1969 | Cheslock | 52/738 X |
| 4,142,343 | 3/1979 | Trafton | 52/738 X |
| 4,194,338 | 3/1980 | Trafton | 52/738 X |
| 4,586,364 | 5/1986 | Berger | 403/381 X |

FOREIGN PATENT DOCUMENTS 2019367 11/1971 Fed. Rep. of Germany ...... 403/381

Primary Examiner—Andrew V. Kundrat
Attorney, Agent, or Firm—Charles D. Gunter, Jr.

[57] ABSTRACT

The invention discloses a two piece connector for the rapid assembly of modular playground equipment, each connector half having a flange at one end for attaching to various components and a jaw at the other end having a tongue cooperative with grooves on a vertical support column for attaching the connector to the support column. A connection is made by placing the tongue of each connector half in an opposing or facing pair of grooves in the desired location on the support column, pulling the flanges together, locking the two connector halves in position on the support column, and then locking the two connector halves together when attachment to a component is made.

5 Claims, 8 Drawing Sheets

GROOVED SUPPORT COLUMN HAVING ADAPTABLE CONNECTORS

This application is a continuation of application Ser. No. 113,390, filed 10/22/87, which is a continuation-in-part of application Ser. No. 871,241, filed June 6, 1986, both now abandoned.

TECHNICAL FIELD

The present invention relates to structural members such as the used for assembling modular playground equipment. In particular, the invention relates to connectors for rapidly assembling modular playground equipment, wherein the connectors can be placed at any point in opposing or facing grooves on a grooved support column and attached to components, such as horizontal support beams, hand rails, ladders, for securing the components to the support columns.

BACKGROUND OF THE INVENTION

Playground equipment has in the past been constructed from modular components comprising vertical support columns, and components attachable thereto such as horizontal beams for supporting decks, handrails, ladders, obstacles, tunnels, or manipulative devices such as steering wheels designed to be manipulated by children when assembly of the playground equipment is complete. In assembling such modular components, the vertical support columns are placed in a post hole in the ground, and concrete is usually poured into the hole and allowed to harden to hold the columns in place, then the desired components are attached to the support columns.

In the building industry horizontal support beams have been attached to grooved vertical support columns using a one-piece connector having a flange at one end and a pair of opposing jaws at the other end. The flange end contained a hole for attaching support beams, and the jaws at the other end contained opposing tongues designed to slide over the top of the vertical column in opposing grooves and to be locked in place at a desired location by the use of fasteners. This type of construction has been adapted for use in constructing modular playground equipment. However, this kind of system requires excessive assembly time, including at least partial disassembly of other components if an error in placing connectors is made or if additional connectors are to be added to an assembled playground set since the connectors must be placed over the top of the column and moved into position by sliding them down a set of grooves.

The present invention provides connectors which can be placed in opposing or facing grooves at the proper location on a grooved vertical support column. The two connectors are then pulled together and locked in place. This substantially decreases the time and effort required for assembly of modular playground equipment and avoids needless disassembly due to mistakes or later expansion of the playground equipment.

SUMMARY OF THE INVENTION

In accordance with the present invention, the connector comprises two substantially identical connector halves each having a flange at one end for attaching to components and a jaw having a tongue at the other end for attaching to a grooved vertical support column by fitting the tongue of the connector into the groove of the vertical support column. The connector of the present invention is formed when two connector halves are placed in opposing grooves of the vertical support column, pulled together, and locked in place on the column.

In one embodiment of the present invention, the two connector halves are locked in place on the column by means of one or more setscrews or other fasteners which are tightened by threading through a nut contained within a recess in the jaw end of each connector half. A component is then attached to the flange end of the two connector halves, for example by bolting through the hole in the flange end of both connector halves, simultaneously locking the two connector halves together.

In another embodiment, the two connector halves are locked in place on the column by means of one or more setscrews or other fasteners which are tightened by threading through threaded holes in the jaw end of each connector half. A component is then attached to the flange end of the two connector halves, for example by bolting through the hole in the flange end of both connector halves, simultaneously locking the two connector halves together.

In yet another embodiment, each connector half has a slightly concave surface on the inside surface of the flange such that when the two connector halves are pulled together a small gap is present where the two flange inside surfaces meet. In this embodiment, when a component is attached, for example by bolting through the hole in the flange end of the two connector halves, the gap between the two flanges closes, each anvil is forced against the vertical support column and each tongue is pulled out against the lip of the groove, simultaneously locking the connector halves in position on the column, locking the two connector halves to each other and to the attached component. Setscrews or other fastening means are not required to lock this embodiment in place on the vertical column.

In a preferred embodiment of the present invention, the support column includes both opposing and facing lipped grooves. Each connector half includes a cam surface between the flange and the tongue. The connector halves may be attached to opposing grooves of the support column, as described above, or they may be placed in facing grooves with their cam surfaces in opposing contact with each other. When the tongues of the connector halves are placed in facing grooves and the flanges are brought together, the opposing cam surfaces act to force the tongues of the connectors into secure engagement with the lips of the facing grooves of the support column. Thus, the connectors of the preferred embodiment are adaptable for use in a greater number of positions around the support column since they can engage both opposing and facing grooves.

Because each connector half can be immediately placed anywhere on the vertical support column without the need for sliding the connector down from the top of the column, significant time and effort is saved in the construction of modular playground equipment, and needless disassembly is avoided when a mistake is made or if it is later desired to increase the size or complexity of the equipment by adding on components.

BRIEF DESCRIPTION OF THE DRAWINGS

Additional objects and advantages of the invention will become apparent after a reading of the following detailed description and upon reference to the accompanying drawings in which.

DETAILED DESCRIPTION OF THE INVENTION

Figure 1:
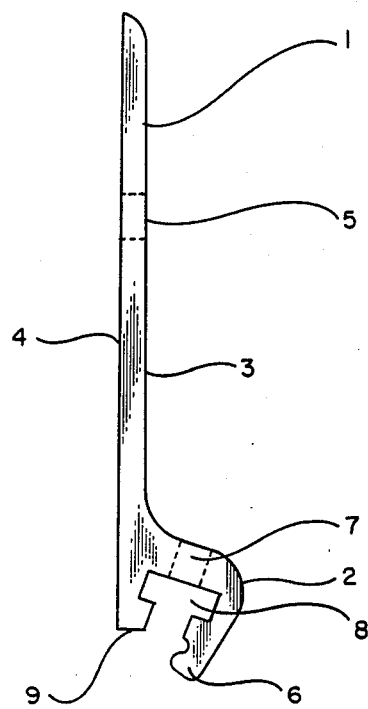
FIG. 1 is a side view of a connector half of the present invention.

FIG. 1 shows a connector half having at one end a generally flat flange (1) and at the other end a jaw (2). The flange (1) has an outside surface (3) and an inside surface (4) and a hole (5) extending completely through the flange (1) from the outside surface (3) to the inside surface (4). The jaw (2) contains a tongue (6), one or more holes (7) which may be threaded or not, a recess (8) and an anvil (9).

Figure 2:
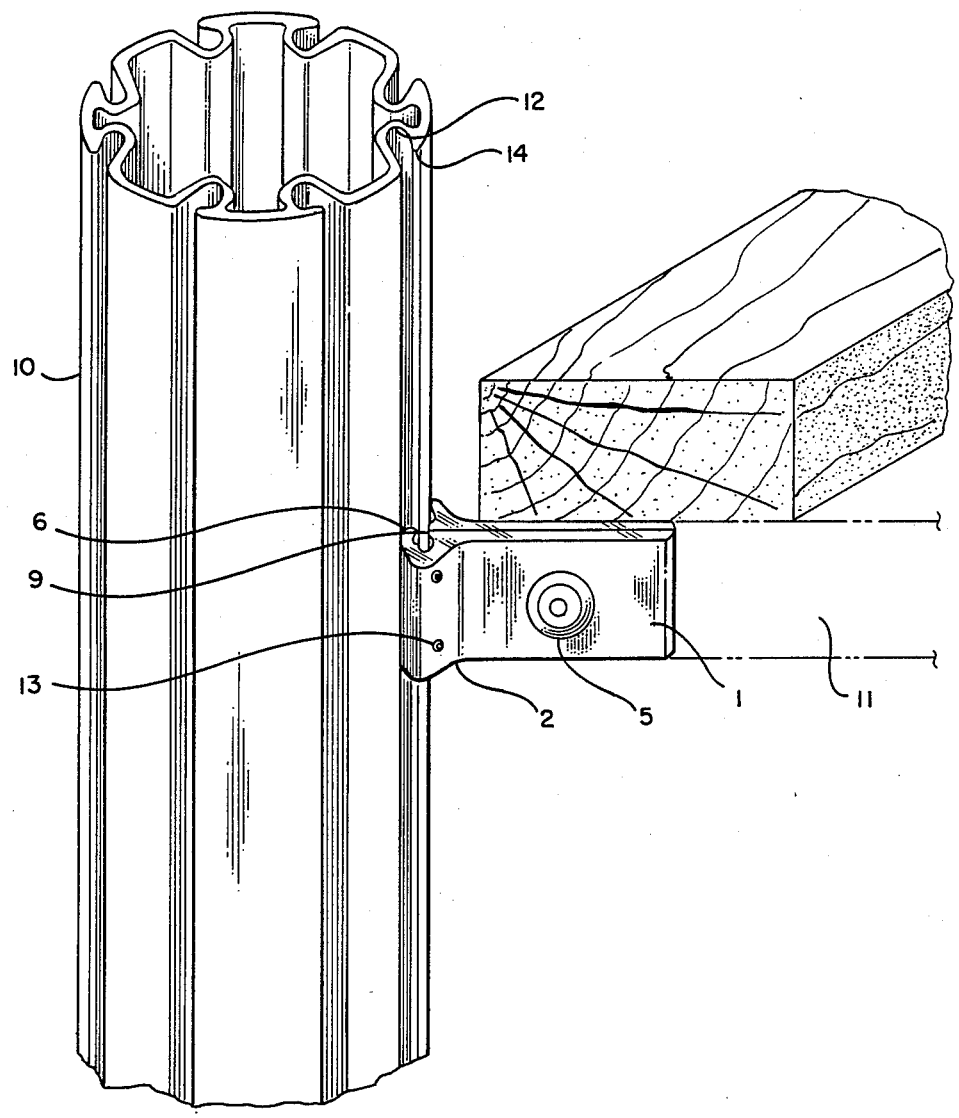
FIG. 2 is a perspective view showing the two piece connector locked onto a vertical support column and attached to a component horizontal support beam for decking.

FIG. 2 shows two connector halves with the jaws (2) locked onto a grooved vertical support column (10) and the flanges (1) attached to a horizontal support beam (11). As shown, assembly is performed by placing the tongue (6) of a connector half in a coordinating groove (12) on the grooved vertical support column (10). Another connector half is similarly placed in the opposing groove (12) and the two halves are pulled together and locked in place on the grooved vertical support column by tightening the set screws (13), which pulls the tongue (6) firmly against the lip (14) of the groove (12), locking each connector half on the column by friction. The two connector halves are then locked together when a component, such as the horizontal support beam (11) is attached to the outside surface (3) of one of the two flanges (1), for example, by bolting through the holes (5) of the two connector halves.

Figure 3:
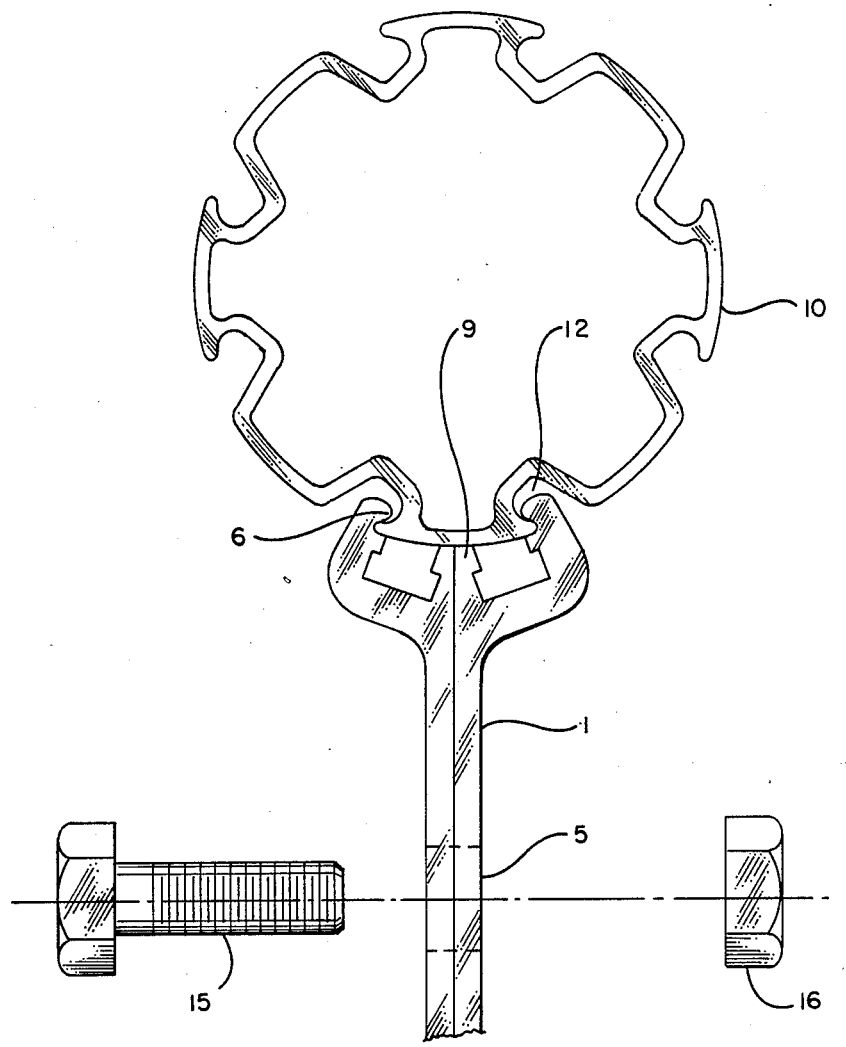
FIG. 3 is an end view showing how each connector half fits onto the grooved vertical support column and is locked together with an opposing connector half.

FIG. 3 further illustrates how the tongue (6) of each connector half fits in coordinating, opposing grooves (12) on the vertical support column (10), and how the two connector halves are locked together by pulling the two flanges (1) together and attaching a component, for example as shown here by inserting a bolt (15) through the holes (5) and locking the two connector halves and component together by tightening a nut (16) over the threaded end of the bolt (15).

Figure 4:
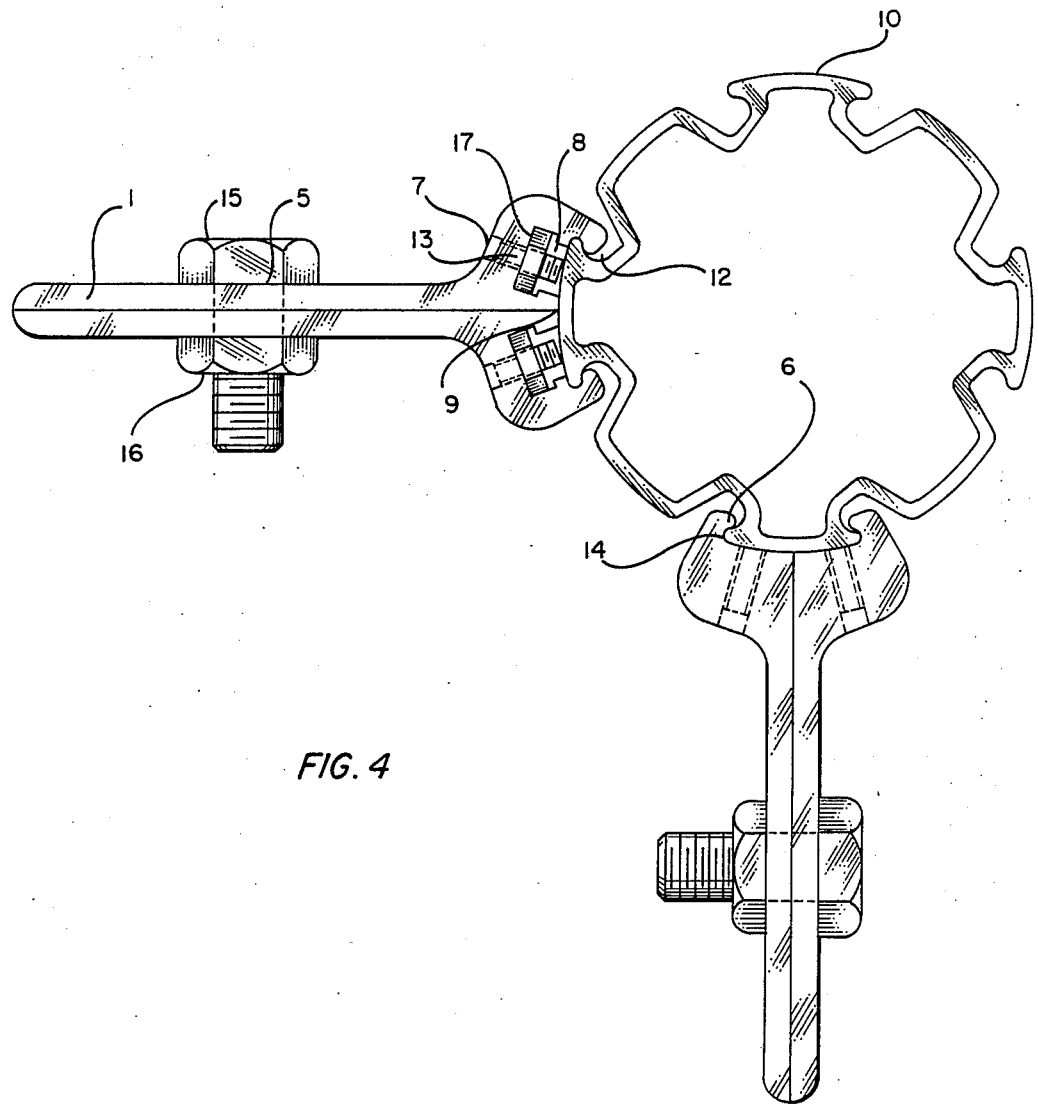
FIG. 4 is an end view showing two embodiments for locking the connector in position on the vertical support column using setscrews.

FIG. 4 shows two embodiments of the invention which use setscrews (13) to secure the two connector halves to the vertical support column (10). In one embodiment, the setscrews (13) are tightened by threading through nuts (17) inserted into recess (8). Alternatively, the recess (8) may be eliminated altogether and the holes (7) may be threaded to receive the setscrews (13). In either of these embodiments, the two connector halves are pulled together and locked on the grooved vertical support column (10) by tightening the setscrews (13). This pulls the tongue (6) firmly against the lip (14) of the groove (12), locking the connector on the column by friction. The two connector halves are then locked together by attachment to a component which is fastened to the flange (1) through the hole (5) for example by using a nut (16) and a bolt (15).

Figure 5:
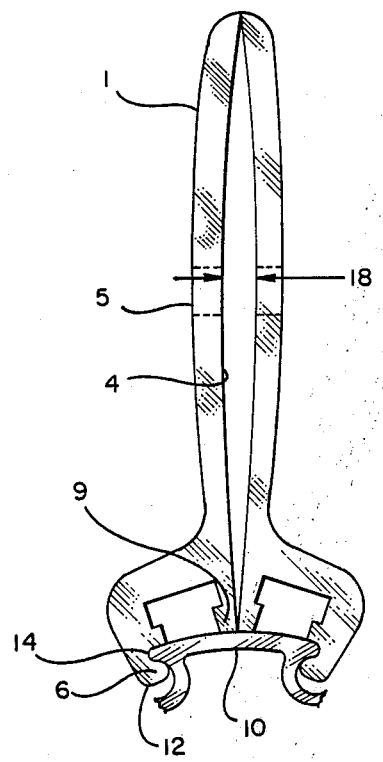
FIG. 5 is a side view showing the gap formed between the inside surfaces of two connector halves having slightly concave inside surfaces on the flange.
Figure 6:
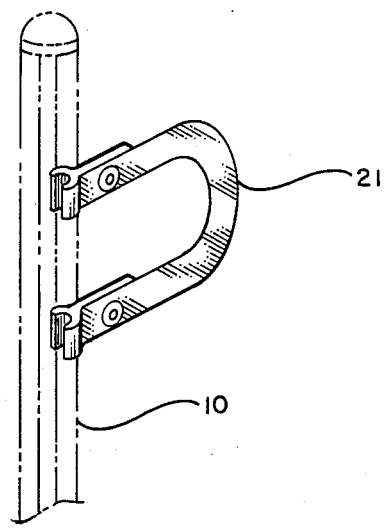
FIG. 6 is a perspective view showing the connector of the present invention used for attaching a component handgrip to a vertical support column.
Figure 7:
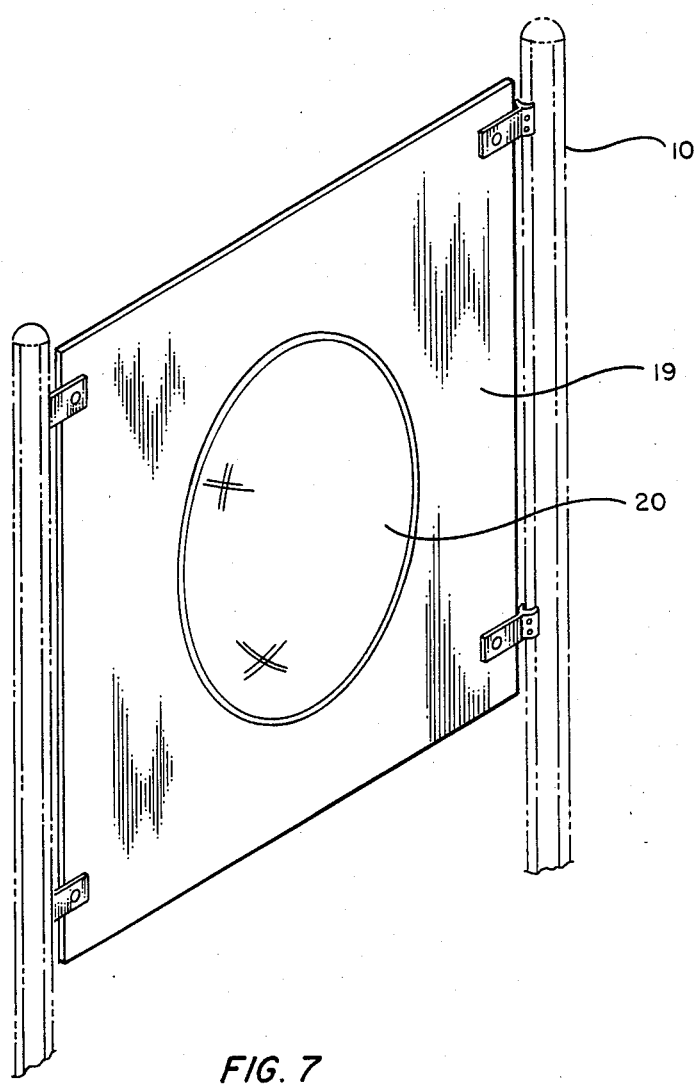
FIG. 7 is a perspective view showing four connectors used for attaching a component board between two vertical support columns.

FIG. 5 shows an embodiment of the invention in which the inside surface (4) of each flange (1) is slightly concave such that when the tongue (6) of each connector half is placed in opposing grooves (12) and the two connector halves are pulled together, a small gap (18) is formed between the flanges (1) of the two connector halves. When a component is tightly attached to the flanges (1) through the hole (5), the gap (18) closes as the fastener is tightened, simultaneously pushing the anvil (9) of each connector half against the vertical support column (10) and pulling the tongue (6) of each connector half tightly back against the lip (14) of the groove (12), locking the connector in place on the column by friction. Setscrews or other fasteners are not shown and not required in this embodiment since the connector is both attached to the component and locked in place on the vertical support column (10) at the same time by closing the gap (18) when attachment through hole (5) is made. It may not be necessary to close the gap (18) completely in order to lock the connector securely on the vertical support column (10). Further, the recess (8) may be optionally present although it is not required for this embodiment. FIGS. 6 and 7 show how the connectors of the present invention can be used to attach a variety of components to the grooved vertical support columns. Such components include boards (19) mounted between two vertical support columns (10) which can contain, for example, a window (20). Handgrips (21) may also be attached to individual grooved vertical support columns (10) using the connectors of the present invention.

The advantages of the present invention over the prior art are significant. All connections between structural members and other components can be made using two substantially identical connector halves for each connection. Assembly time of modular playground equipment is significantly decreased because the connectors can be placed directly at the desired location on the vertical support columns without the necessity to place them in the grooves at the top of the column and slide them into position. Further, the ability to place the connectors at any position on the column eliminates the need for partial disassembly encountered in the prior art when a mistake in assembly is made or when it is later desired to add components to a preexisting assembled set of playground equipment.

The simplicity of the connections and the ease of assembly is apparent from a consideration of FIGS. 1 through 5. The tongues (6) of each connector half are placed in opposing grooves (12) at the desired location on the grooved vertical support column (10). The flanges (1) are then pulled together and the connector is locked in position on the grooved vertical support column (10). In one embodiment, the connector is locked in position on the grooved vertical support column (10) when a component is attached to the flanges (1) of the two connector halves. This is made possible by constructing the flange (1) of each connector half so that the inside surface (4) is slightly concave and forms a small gap (18) when the two connector halves are pulled together. This gap (18) is closed when a component is attached to and tightened on the flanges (1) of the connector halves through the holes (5). As the connection is tightened and the gap (18) closes, the anvil (9) of each connector half is forced against the vertical support column (10) and the tongue (6) of each connector half is pulled out tightly against the lip (14) of each groove (12), simultaneously holding the connector halves together and locking them in place on the column by friction. It may not be necessary to completely close the gap (18) in order to securely lock the connector in position on the vertical support column (10). Further, the area of the anvil and the corresponding strength of the connection between the vertical support column (10) and the connector may be increased by eliminating recess (8). One skilled in the art will recognize at once that setscrews or other fastening means can be optionally used to further secure the connectors to the vertical support columns.

In an alternative embodiment, the connector is locked in position on the grooved vertical support column (10) by tightening one or more setscrews (13) or similar fasteners through holes (7) in the jaw (2) of each connector half. This can be done by threading the setscrews (13) through nuts (17) placed in the recess (8) of each jaw (2), or alternatively by eliminating recess (8) and constructing the holes (7) with threads which will cooperate with the setscrew (13). By tightening the setscrews (13) of this embodiment the anvil (9) is pulled away from the grooved vertical support column (10) and the tongue (6) of each connector half is pulled tightly against the lip (14) of each groove (12). The connection is then completed by fastening a component to the flanges (1) through the holes (5) of the two connector halves.

A consideration of FIGS. 2, 6 and 7 make apparent the wide variety of components which may be attached to the grooved vertical support columns (10) using the connector of the present invention. Horizontal support beams (11) which can be used to support platforms and decks can be easily attached between pairs of vertical support columns (10) using the present invention. Handgrips (21) can be attached anywhere they are desired on single vertical support columns (10). Boards (19) can be attached between two vertical support columns (10) to provide a base for mounting windows (20), obstacles such as holes or tunnels for children to crawl through, or manipulative devices such as steering wheels. Other components which can be attached using the present invention include horizontal and vertical ladders, handrails, chains, slides, chin-up bars and other such components commonly found on playground equipment.

Figure 8:
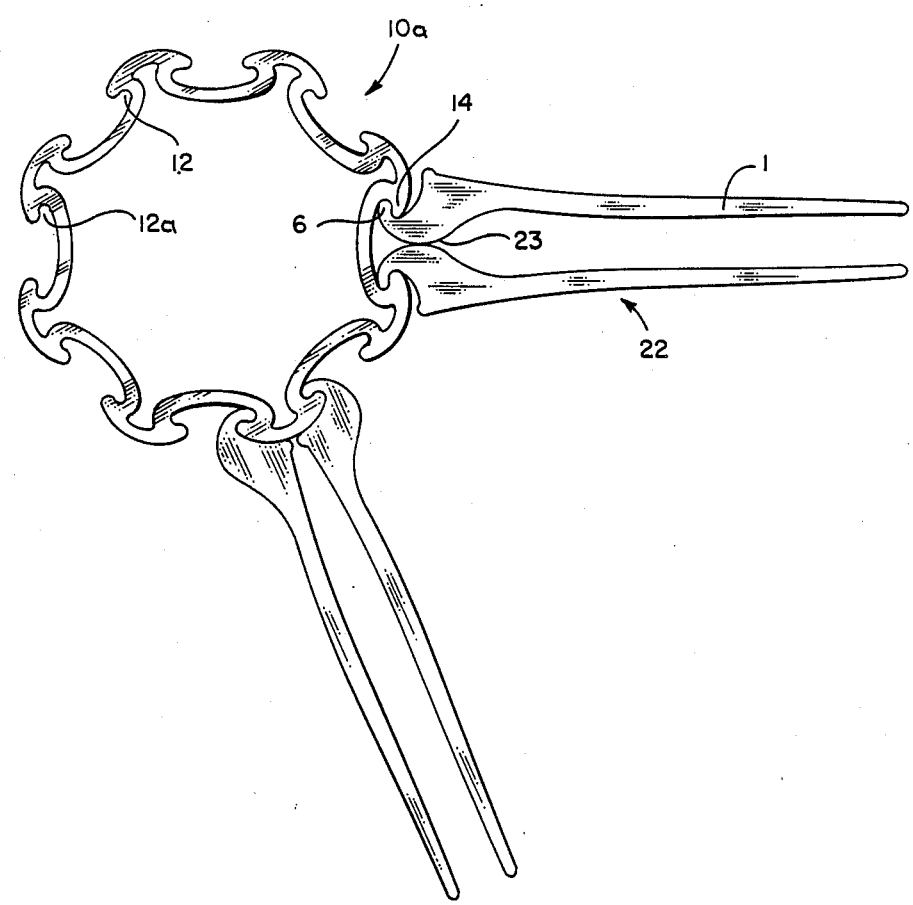
FIG. 8 is a top view of a preferred embodiment of the present invention showing the connectors positioned in both opposing and facing grooves of the support column.

FIG. 8 is a top view of a preferred embodiment of the present invention wherein like reference numerals refer to the same or corresponding parts as described in the previous embodiments. Support column (10a) has a cross-sectional perimeter with all curved surfaces including a plurality of opposing grooves (12) and a plurality of facing grooves (12a). Connectors 22 of the preferred embodiment include an outer cam surface (23) between the tongue (6) and the flange (1). As shown in FIG. 8, connectors (22) are adaptable to be attached to either the opposing grooves (12) or the facing grooves (12a). Attachment of connectors (22) to opposing grooves (12) is substantially similar to that of the previously illustrated and described embodiments. When attached to facing grooves (12a) of support column (10a), the tongues (6) of connectors (22) engage facing lips (14) of column (10a) with outer cam surfaces (23) of connectors (22) in abutting contact. As the flanges (1) of connectors (22) are brought together and secured, the cam surfaces (23) apply opposing force to each other to engage the tongues (6) securely against lips (14) of facing grooves (12a). When removing connectors (22) from facing grooves (12a), the flanges (1) are simply opened apart, thereby causing the cam surfaces (23) to separate so that tongues (6) may be withdrawn from grooves (12a) and lips (14).

The present invention is preferably constructed using aluminum, but may also be constructed using steel, high strength metal alloys, structural plastics and other similar materials.

One skilled in the art will recognize at once that it is possible to construct this invention from a variety of materials and in a wide range of sizes and that it is further possible to use the present invention in conjunction with a variety of vertical, horizontal, or angled grooved columns or forms. While the preferred embodiments of the present invention have been described in detail, and shown in the accompanying drawings, it will be evident that various further modifications are possible without departing from the scope of the invention.

I claim:

1. A structural apparatus, comprising:
   a support column having a plurality of longitudinal grooves, said grooves comprising opposing lips and facing lips;
   a connector attachable to said support column, comprising:
      a jaw having a hook-shaped tongue for engaging one of said lips;
      an elongate flange extending from said jaw;
      an outer cam surface between said jaw and said flange;
   wherein said tongues of a pair of said connectors are adapted for engaging said opposing lips as said flanges are drawn together and, alternatively, for engaging said facing lips so that said cam surfaces are in abutting contact as said flanges are drawn together, thereby attaching said connectors to said support column.

2. The apparatus of claim 1, wherein said grooves and lips comprise curved surfaces.

3. The apparatus of claim 1, further comprising means for locking together said flanges of said pair of attached connectors, thereby securing said connectors to said support column.

4. The apparatus of claim 3, further comprising means for mounting attachable components to said locked flanges of said connectors.

5. An apparatus, comprising:
   a support column having a plurality of longitudinal grooves, said grooves having curved surfaces forming opposing lips and facing lips:
   a pair of connectors attachable to said support column, each connector comprising a jaw having a hook-shaped tongue for engaging one of said lips, an elongate flange extending from said jaw and having means for attaching components thereto, and an outer cam surface between said jaw and said flange;

said tongue of said connectors adapted for engaging respective facing lips so that said cam surfaces are in abutting contact with each other as said flanges are drawn together, thereby securing said connectors to said support column; and
wherein said tongues of said connectors are adapted for engaging, alternatively, said opposing lips of said grooves as said flanges are drawn together, thereby securing said connectors to said support column.

* * * * *

UNITED STATES PATENT AND TRADEMARK OFFICE
CERTIFICATE OF CORRECTION

PATENT NO.   :   4,941,763
DATED        :   July 17, 1990
INVENTOR(S)  :   Duane D. Kidman It is certified that error appears in the above-identified patent and that said Letters Patent is hereby corrected as shown below:

On the title page:

Please change the inventor's name on page 1 from "Vaughan O. Euteneuer" to --Duane D. Kidman--.

Signed and Sealed this

Twenty-fourth Day of September, 1991

Attest:

HARRY F. MANBECK, JR.

Attesting Officer

Commissioner of Patents and Trademarks